(12) United States Patent
Kaltenborn

(10) Patent No.: US 6,806,311 B1
(45) Date of Patent: Oct. 19, 2004

(54) MOLD RELEASE AGENT FOR DUROPLASTIC MOLDED PARTS

(75) Inventor: Uwe Kaltenborn, Baden-Dättwil (CH)

(73) Assignee: ABB Research LTD, Zurich (CH)

( * ) Notice: Subject to any disclaimer, the term of this patent is extended or adjusted under 35 U.S.C. 154(b) by 194 days.

(21) Appl. No.: 10/089,298

(22) PCT Filed: Sep. 11, 2000

(86) PCT No.: PCT/CH00/00486

§ 371 (c)(1),
(2), (4) Date: Mar. 29, 2002

(87) PCT Pub. No.: WO01/23160

PCT Pub. Date: Apr. 5, 2001

(30) Foreign Application Priority Data

Sep. 30, 1999 (DE) ......................... 199 46 916

(51) Int. Cl.⁷ .............................................. C08L 83/06
(52) U.S. Cl. ..................................... 524/837; 525/477
(58) Field of Search ........................... 525/477; 524/837

(56) References Cited

U.S. PATENT DOCUMENTS

| | | |
|---|---|---|
| 4,537,803 A | 8/1985 | Dakin et al. |
| 5,306,747 A | 4/1994 | Ito et al. |
| 5,401,580 A | 3/1995 | Meguriya et al. |
| 5,714,265 A | 2/1998 | Meguriya et al. |
| 6,294,007 B1 * | 9/2001 | Martin ................ 106/38.22 |

FOREIGN PATENT DOCUMENTS

| | | |
|---|---|---|
| EP | 0 136 358 | 4/1985 |
| EP | 305 838 | 3/1989 |
| EP | 0 306 302 | 3/1989 |
| EP | 325 210 | 7/1989 |
| EP | 0 668 137 A2 | 8/1995 |
| EP | 1 008 429 A1 | 6/2000 |

OTHER PUBLICATIONS

Database WPI, Section Ch, Week 198748, Derwent Publications Ltd., London, GB; Class A26, AN 1987–337153, XP002155279 & JP 62 240363 A (Shinetsu Chem Ind Co LTD), Oct. 21, 1987 Zusammenfassung.

Patent Abstracts of Japan vol. 1996, No. 04, Apr. 30, 1996 & JP 07 316432 A (shin Etsu Chem Co Ltd), Dec. 5, 1995 Zusammenfassung.

* cited by examiner

Primary Examiner—Kuo-Liang Peng
(74) Attorney, Agent, or Firm—Burns, Doane, Swecker & Mathis, L.L.P.

(57) ABSTRACT

Mold-release agent for producing thermoset moldings with a hydrophobicized surface, where the agent comproses (I) at least one compound with mold-release action, and also (ii) at least one reactive, where appropriate hydrolyzable, silane compound, which is capable of reacting chemically in situ with the thermoset surface which forms during the molding process. The use of a mold-release agent of this type in a molding process and/or in a post-curing process for the production of thermoset moldings with a hydrophobicized surface, and also the moldings produced in this way.

22 Claims, No Drawings

MOLD RELEASE AGENT FOR DUROPLASTIC MOLDED PARTS

FIELD OF THE INVENTION

The present invention relates to a mold-release agent which may be used in particular in the processing of thermoset moldings. According to the invention, the mold-release agent brings about the ready separation of the molding from the mold, while at the same time bringing about chemical linkage of short-chain and/or long-chain silicone compounds to the surface of the thermoset molding. This achieves effective hydrophobicization of the surface of the molding.

BACKGROUND OF THE INVENTION

Thermoset materials, in particular epoxy resins, are widely used as electrically insulating materials in medium- and high-voltage technology, for example for the construction of switchgear assemblies. The insulating materials currently known mostly have adequately good electrical properties. The suitability of these insulating materials for use is therefore also based on high requirements for mechanical properties, in particular for mechanical strength and mechanical flexibility, and for behavior in the presence of contaminant layers, and for resistance to the complex electrical and climatic stresses arising at high humidity. Epoxy resins in particular are treated below as a preferred embodiment. Similar considerations apply to other thermoset materials.

Although the properties of epoxy resins are excellent for an insulating material, their use has remained essentially restricted to indoor applications. Insulation materials represent sectors in which epoxy resins are widely used, examples being found in instrument transformers, bushings, power breakers, dry-type transformers, and electrical machinery. Insulation made from epoxy resins is used only rarely in outdoor applications. The causes for this are primarily lack of resistance to UV radiation and behavior in the presence of a contaminant layer. Another aspect here is low resistance to complex electrical and atmospheric stresses. Studies have shown that failure of insulation parts can occur even in indoor systems. If, for example, a deposit of contaminant layers is present on the surface of the molding and there is the possibility of water condensation, some of the stresses which arise are markedly greater than those to which outdoor systems are exposed, and these therefore cause an increased level of failure. Conditions of this type are also termed difficult indoor conditions.

If condensation of water arises on the surfaces under the conditions described, insulating action is substantially dependent on the water-repellency (hydrophobic properties) of the surface. If these surfaces are highly hydrophobic, as is the case with some silicones, deposits of condensed water form as individual droplets separate from one another. However, in the case of hydrophilic surfaces, wetting with a liquid generally gives rise to formation of a coherent film deposit which can lead to short-circuiting of the insulator. A hydrophobic surface is therefore highly advantageous. Epoxy resin surfaces, like many other thermoset resin surfaces, do not have hydrophobic properties, since the epoxy resin matrix has polar character.

Various methods have previously been proposed to improve hydrophobic surface properties. For example, U.S. Pat. No. 4,537,803 claims the addition of a polymerizable silicone oil to the epoxy resin mixture. U.S. Pat. No. 5,306,747 relates to the addition of a modified silicone oil which can react chemically with the resin system. Other proposals likewise include the addition of silicone-based compounds to the epoxy resin mixture. A fundamental disadvantage of all of these methods is that the thermoset matrix to be polymerized is altered by the addition of the silicone compound. For example, the nature of the alterations in physical properties, in reactivity, and in properties relating to flow and to machining may be such as to cause demixing phenomena or electrical discharges in cavities, for example.

SUMMARY OF THE INVENTION

It has been found that the process of the present invention eliminates all of the disadvantages mentioned from addition of the silicone compound to the matrix, or entirely prevents the occurrence of these problems, if it is possible to hydrophobicize only the surface of the molding in an adequate manner. Surprisingly, it has now been found that it is possible to hydrophobicize only the surface of the moldings in the molding procedure, without any additional process step, if the mold-release agent used comprises a mixture which comprises (i) at least one compound with mold-release action, preferably a silicone compound, and also (ii) at least one reactive silane compound which is capable of reacting chemically with the epoxy resin surface which forms during the molding process. The mold-release agent of the invention may comprise (iii) other additives where appropriate, for example aqueous and/or non-aqueous solvents. It is surprising that the component (i), i.e. the silicone compound with mold-release action, can be added to component (ii), i.e. the reactive silane compound, without any noticeable inhibition of the mold-release action of the component (i) by the silane compound. At the same time, the reactive component (ii) is capable, during the molding or the mold-release procedure, of reacting in situ with the molding surface which forms. What is formed here is a stable uniform, thin, hydrophobic, silicone-containing layer on the surface of the molding. The surface of the molding is modified chemically in such a way as to have, under difficult indoor conditions, a markedly higher level of hydrophobic properties and a markedly higher level of hydrophobic stability, with the result that surface-modified moldings of this type can be used with advantage as insulating parts in medium- or high-voltage technology. According to the invention, the molding material systems known per se, and also the procedures for their preparation, may be retained here with no alteration. Their physical properties and their behavior in the molding process are not altered. Starting, therefore, from the highly adhesive properties of epoxy resins, the mold-release agent of the invention is used to permit manufacture of moldings of this type without adhesion within the mold, and at the same time to provide effective in-situ hydrophobicization of the surface of the molding formed, in the same process step.

The present invention has been defined in the claims. In particular, the present invention provides a mold-release agent for the production of thermoset moldings with a hydrophobicized surface, characterized in that this comprises (i) at least one compound with mold-release action, preferably a silicone compound, and also (ii) at least one reactive, where appropriate hydrolyzable, silane compound which is capable of reacting chemically with the uncured or incompletely cured thermoset surface. The mold-release agent of the invention may comprise (iii) other additives where appropriate, preferably aqueous and/or non-aqueous solvents.

The term "uncured or incompletely cured thermoset surface" means the surface in situ in the molding process. This term also includes, for example, the surface of a demolded incompletely cured molding which is subjected to post-curing. This means that the mold-release agent of the invention may be used as mold-release agent and hydrophobicizing agent in the molding process and/or as hydrophobicizing agent in the post-curing process, the mentioned advantageous properties being retained.

The present invention also provides the use of the mold-release agent of the invention in the molding process and/or in the post-curing process for the production of thermoset moldings with a hydrophobicized surface.

The invention further provides a process for producing thermoset moldings with a hydrophobicized surface, which comprises using, in the molding process, a mold-release agent which comprises (i) at least one compound with mold-release action, and also (ii) at least one reactive, where appropriate hydrolyzable, silane compound which is capable of reacting chemically in situ with the uncured or incompletely cured thermoset surface.

The present invention also provides the thermoset moldings produced according to the invention.

Mold-release agents for thermoset materials, and also their use and function in the molding process, are known per se. The components used with release action are very often the silicones known per se or polymethylsiloxanes known per se, both of which contain terminal trimethylsilyl groups, or a mixture of compounds of this type. Silicones of this type and mixtures of these may, where appropriate, also comprise silane compounds with mold-release action, such as those defined below as compounds of the general formula (II). The proportion of all of the constituents with release action may be in the range from 1 to 98% by weight, based on the total weight of the mold-release agent. From 11.5 to 15% by weight and from 85 to 98% by weight, based on the total weight of the mold-release agent, have hitherto proven ideal. The remainder of the mold-release agent is composed of the reactive silane compound [component (ii)] defined below, and also of aqueous or non-aqueous solvents and, where appropriate, other additives. A significant factor for the mold-release action of the mold-release agent of the invention is the proportion of preferred polydimethyl-siloxanes of the general formula (I),

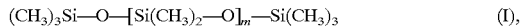   (I), where
 m is zero or an integer from 1 to 1 000, preferably an integer from 10 to 50.

The setting points of the compounds of the formula (I) are preferably in the range from −50° C. to 0° C., and their boiling points are preferably above 80° C. (>80° C.), and their molecular weight is preferably in the range from 162 to 74 000.

However, it is not only polydimethylsiloxanes which may be used as compounds with mold-release action. For example, there are also known siloxanes which contain functional groups or else ethyl groups instead of the methyl groups. Compounds of this type also have mold-release action and may be used for the purposes of the present invention together with or instead of compounds of the formula (I). Where appropriate, mixtures of the compounds of the formula (I) may comprise, as mentioned, other silanes with release action, preferably of the general formula (II), as admixture, i.e. at concentrations from 0.01 to 50.0% by weight, preferably from 1.5 to 5.0% by weight, based on the weight of the compounds present of the formula (I). The silanes mentioned preferably have the general formula (II):

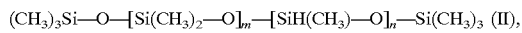   (II), where
 m is as defied above, and
 n is an integer from 1 to 50, preferably an integer from 1 to 10, and the dimethylsilyloxy groups and the methylhydrosilyl-oxy groups in the molecule have been arranged in any desired sequence.

A significant constituent for the purposes of achieving the objects of the invention is the reactive silane compound (also termed "primer" below). Preference is given to compounds of the general formula (III):

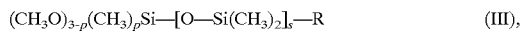   (III), where
 p is zero, 1, 2, or 3, preferably zero or 1,
 s is zero or an integer from 1 to 100, preferably from zero to 10,
 R is a monovalent, unsubstituted or hydroxyl-sub-stituted, organic radical which has one or more reactive groups capable of reacting chemically with an epoxy resin.

In the compound of the formula (III), the methylsilyl group may also, for example, have been replaced by ethylsilyl. Trimethoxysilyl may likewise have been replaced by triethoxysilyl. To this extent, the term methyl also means, in each case independently of the others, ethyl, propyl, or butyl.

The reactive groups mentioned have preferably been selected from glycidyl, hydroxyl, amino (—NH$_2$) and the isocyanate group (—N=C=O). Another reactive group which may be used is an ester group, such as an acetyl ester group, which after intermediate hydrolysis gives a compound which can react chemically with the matrix.

R in the compound of the general formula (III) is preferably a 3-glycidoxypropyl radical;
where p is preferably zero or 1, preferably zero, and s is preferably zero. Preference is given to 3-glycidoxypropyltrimethoxysilane and 3-glycidoxypropylmethyldimethoxysilane.

If R is a radical which bears a reactive group, this radical preferably has the formula (V):

-A-(reactive group)   (V), where
 A is a saturated or unsaturated bivalent aliphatic radical which may contain one or more oxygen atoms and/or —NH groups, or is a bivalent cyclo-aliphatic radical, or a bivalent aromatic radical, or a saturated or unsaturated aliphatic radical which may contain one or more oxygen atoms and/or —NH groups and has phenylene substitution, in each case one free valency of this bivalent radical being bonded to a reactive group.

The sated or unsaturated bivalent aliphatic radical A is preferably a radical of the formula —(CH$_2$)$_t$—, where t is an integer from 1 to 4, preferably 2, 3, or 4.

The bivalent cycloaliphatic radical A is preferably cyclohexylene, and the bivalent aromatic radical A is preferably phenylene, with preference meta- or para-phenylene.

The saturated or unsaturated aliphatic radical A with phenylene substitution, where in each case one free valency has been occupied by the reactive group, is preferably , the reactive group preferably being bonded to the phenylene, preferably in meta- or para-position.

Examples of preferred compounds of the formula (III) which have a radical of the formula (V) are m-aminophenyltrimethoxy-silane [H$_2$N—(C$_6$H$_4$)—Si(OCH$_3$)$_3$], p-aminophenyltrimethoxy-silane [H$_2$N—(C$_6$H$_4$)Si(OCH$_3$)$_3$], 3-aminophenoxy)propyl-trimethoxysilane [H$_2$N—(C$_6$H$_4$)—OCH$_2$CH$_2$Si(OCH$_3$)$_3$], {3-(2-aminoethyl)aminopropyl}tri-methoxysilane [H$_2$NCH$_2$CH$_2$NH(CH$_2$)$_3$Si(OCH$_3$)$_3$].

Examples of reactive compounds of the formula (III) which contain ester groups are acetyloxymethyltrimethoxysilane [CH$_3$COOCH$_2$Si(OCH$_3$)$_3$], and acetyloxypropyltrimethoxysilane [CH$_3$COO(CH$_2$)$_3$Si(OCH$_3$)$_3$].

Examples of reactive compounds of the formula (III) which have a hydroxyl group are hydroxymethyltriethoxysilane [HO—CH$_2$—Si(C$_2$H$_5$)$_3$] and hydroxymethyltriethylsilane [HO—CH$_2$—Si(CH$_3$)$_3$].

Isocyanatopropyltriethoxysilane [OCN—(CH$_2$)$_3$—Si(OC$_2$H$_5$)$_3$] is an example of a compound of the formula (III) which contains an isocyanate group.

The compounds of the formula (III), and also their preparation, are known per se and have been described in detail in the literature.

Preference is also given to more complex compounds having two or more reactive groups corresponding to the substituent R and having a greater number of methoxysilane groups, for example compounds of the general formula (VI):

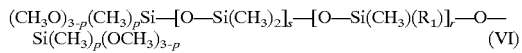

(CH$_3$O)$_{3-p}$(CH$_3$)$_p$Si—[O—Si(CH$_3$)$_2$]$_s$—[O—Si(CH$_3$)(R$_1$)]$_r$—O—Si(CH$_3$)$_p$(OCH$_3$)$_{3-p}$ (VI)

where r is an integer from 1 to 5, preferably 1, 2, or 3,

R$_1$, independently of one another, are as defined for R above, and s is as defined above, where the radicals —O—Si(CH$_3$)$_2$— and —O—Si(CH$_3$)(R$_1$) in the molecule have been arranged in any desired sequence.

To prepare the mold-release agent of the invention, it is preferable to begin by dissolving component (i), i.e. the compound with mold-release action, in a non-aqueous solvent, or by preparing component (i) in the form of an aqueous emulsion. However, the use of organic solvents requires control of all of the relevant risks to the health of the user and to the environment. An emulsion in water is therefore preferable. The aqueous emulsion is prepared in a manner known per se, using emulsifiers. Examples of preferred emulsifiers are organosilyl- or organosiloxanylcarboxylic acids, and alkylsyloxy-substituted alkylpolyethylene ether compounds.

Components (ii), i.e. the reactive silane compound (III) and/or (VI) is then added to the solution or to the aqueous emulsion, and if water is used it is preferable that the reactive silane compound is likewise emulsified. However, it is also possible for the components in any desired sequence, separately or together, to be dissolved in a solvent, or to be emulsified in water.

The mold-release agent of the invention is composed mainly of the mixture of the dissolved or emulsified component (i) with release action and of the primer, i.e. the reactive component (ii). The mixing ratio of the component (i) with release action to the reactive component (ii) here is important, and may be optimized for the compounds used. For a system based on poly-dimethylsiloxane, where average n is from 10 to 50, a highly active mold-release agent is obtained with a proportion of 1% by weight of primer, based on the total weight of the mixture. The proportion of primer may be reduced as far as 5 parts per thousand, based on the total weight of the mixture. This results in a reduction in the amount of the siloxane chemically bonded to the epoxy resin surface. If the proportion of primer is reduced further, it is no longer certain that there will be uniform and coherent binding of the siloxanes to the epoxy resin surface. If the proportion of primer is increased, the release action generated by the component (i) with release action with respect to the mold wall reduces. The proportion of primer, or the proportion of reactive silane of component (ii), is therefore preferably from 5 parts per thousand to 5% by weight, preferably from 0.1 to 2% by weight, based on the total weight of the mold-release agent of the invention.

In the case of water-containing mold-release agents, when the primer is added there is at least some hydrolysis of the methoxy groups present in component (ii). For solvent-containing and substantially water-free mold-release agents, it is mainly atmospheric moisture which hydrolyzes the methoxy groups. The hydrolysis of all of the methoxy groups, or complete crosslinking, generally takes place by virtue of atmospheric moisture after application to the surface of the molding.

A release agent based on an oil-in-water emulsion generally requires a preheated mold for processing. However, this requirement is generally complied with in most cases in the processing of casting resins. To increase emulsifiability, a surfactant or a mixture of surfactants may be added to the mold-release agent. The proportion of the surfactant is preferably in the range from 0.002 to 5% by weight, preferably from 0.05 to 2% by weight, based on the total weight of the mold-release agent of the invention.

According to the invention, the composition used capable of thermoset curing may be a thermoset molding composition known per se. A large number of thermoset plastics is known from the literature. The extent to which these are present in the molding is at least that to which these thermoset compositions are capable of giving effective chemical reaction with the reactive silane compound [component (ii)]. Examples of thermoset molding compositions are polycondensates and polyadducts. Examples of polycondensates are curable phenol-formaldehyde plastics, curable bisphenol resins, curable urea-formaldehyde plastics, polyimides, poly-benzimidazoles. Examples of thermoset plastics in the form of polyadducts are epoxy resins, unsaturated polyester resin molding compositions, DAP resins (poly-diallyl phthalate), curable melamine-phenol-formaldehyde molding compositions, and crosslinked polyurethanes. Preference is given to those with good electrical properties, preferably aromatic or cycloaliphatic epoxy resins, and also PU casting compositions, in particular, as are known per se and used in the electrical industry, filled epoxy resins and PU resins. Preferred fillers which may be used are powdered quartz, aluminum oxide, and dolomite in a variety of ground forms known per se, and also those with silanized surfaces.

Examples of additives which may be used for thermoset compositions in the form of poplycondensates or of polyadducts, besides the resin/hardener/accelerator system for thermosets, are release agents, lubricants, fillers, pigments, coupling agents, stabilizers, and inhibitors. These compounds are known per se.

When the mold-release agent is used, it is applied by means of methods known per se to the heated mold wall. Examples of these methods are spraying, brushing, wiping, and/or dipping. The mold may be composed of a variety of metals, preferably of steel, copper, or aluminum, or else of silicate glasses or ceramics. The mold is preferably composed of a material based on steel or aluminum, or of polymeric materials, such as filled epoxy resins. The surface roughness of the mold wall has been observed to be an important process pararmeter. The surfaces should have the lowest possible roughness, preferably for example that which is obtained when steel is honed or lapped. The temperature of the mold wall may be from 20 to 180° C. The temperatures are preferably set at from 60 to 140° C. Once the mold-release agent of the invention has been applied, the solvent evaporates, and the mold-release agent film composed of the formulation of the invention remains on the surface of the mold. When, using known processes, such as vacuum casting, pressure gelation, or open casting, the casting resin composition is cast into the mold thus prepared, the exothermic curing reaction of the thermoset molding composition starts from the mold wall, since the heated mold already has the activation energy needed. In this process, the reactive component (ii) is simultaneously incorporated chemically into the matrix of the epoxy resin or onto its surface by way of the radical R defined above and, where appropriate, also by way of the methoxysilane group. This ensures that the entire surface receives a hydrophobicizing impregnation during the curing reaction. It is also possible here to bond compounds of the formula (II) chemically, directly or indirectly, to the surface of the cured molding which forms. During the curing reaction, the mold may be externally heated, or else cooled. After the gelling process, the moldings may be removed from the mold and cured completely in a further step. To this extent, it is also possible that the surface of an incompletely cured demolded molding which is subjected to post-curing is treated in advance with the mold-release agent of the invention. Any desired mold-release agent may be used here in the molding process. The temperatures used in the post-curing process here are usual and known per se, and are comparable with the molding temperatures.

The surfaces produced by the process described above exhibit hydrophobic properties, as are known for surfaces comprising silicones. There is a marked improvement both in hydrophobic properties and in hydrophobic stability. It is moreover possible to measure some recuperation of hydrophobic properties. However, it is apparent here that since the layer of the siloxanes is thin, the recuperation found with full-body silicone cannot reliably be provided. The hydrophobic properties have also proven to be unsuitable for instances where the surface has exposure to an abrasive process, for example where the surface is ground away by sandstorms. The application sector for the mold-release agent of the invention and for the moldings produced according to the invention is therefore mainly in the construction of switchgear, where difficult indoor conditions have to be withstood for long periods. Other usable application sectors are insulating parts for high-voltage switches, and outdoor insulation in a maritime atmosphere or where there is industrial pollution. Another significant factor for the invention is that all of the mechanical properties and the non-surface-dependent electrical properties of the thermosets, for example of the epoxy resin, are retained unaltered by the modification. The examples below illustrate the invention.

EXAMPLE 1

From 1 to 10 ml of 3-glycidyloxypropyltrimethoxysilane are added, with stirring, to 100 ml of an aqueous emulsion made from silanes with small amounts of siloxanes (for example Aquathan 27/077 mold-release agent from the company Block Chemie KG, Mölln, Germany), and the mixture is homogenized for 5 minutes with continuous stirring. The resultant mold-release agent is processed within 24 hours.

EXAMPLE 2

Each of 1, 3, 5, 7, and 10 ml of 3-glycidyloxypropyltrimethoxysilane is dissolved in a turbo stirrer, using 30 ml of dist. water. This solution is then stirred into 100 ml of Aquathan 27/077, as described in Example 1. The resultant mold-release agent is processed within 24 hours.

EXAMPLE 3

Each of 1, 3, 5, 7, and 10 ml of 3-glycidyloxypropyltrimethoxysilane is mixed with 30 ml of isopropanol in a mixer and then stirred into 100 ml of Aquathan 27/077. The resultant mold-release agent is processed within 24 hours.

EXAMPLE 4

100 ml of an aqueous emulsion made from short-chain siloxanes and silanes (for example Aquathan 10/050 mold-release agent from the company Block Chemie KG, Mölln, Germany) are added dropwise to each of 1, 2, 4, 5.5, and 7.5 ml of 3-glycidyloxypropyltrimethoxysilane in a mixing system, and incorporated by stirring for at least 5 minutes. The mixture is processed within 12 hours.

EXAMPLE 5

The procedure is based on that of Example 4. However, the primer is preemulsified in distilled water, using a turbo stirrer.

EXAMPLE 6

The procedure is based on that of Example 4. However, the primer is dissolved in isopropanol, using a stirrer.

EXAMPLE 7

Each of 1, 2, and 3 ml of 3-glycidyloxypropyltrimethoxysilane is added, with stirring, to 100 ml of a solvent-free mold-release mixture made from siloxanes and silanes (for example 365 mold-release concentrate from the company Block Chemie KG, Mölln, Germany), with stirring. If all moisture is excluded, the resultant mixture can be stored for up to six months.

EXAMPLE 8

The procedure is based on that of Example 7. However, the primer is preemulsified in distilled water, using a turbo stirrer.

EXAMPLE 9

The procedure is based on that of Example 7. However, the primer is dissolved in isopropanol, using a stirrer.

EXAMPLE 10

Production of a Molding by Conventional Vacuum Casting a) Preparation of epoxy resin mixture: 100 parts of Cy 205 aromatic epoxy resin (from Ciba SC Ltd) are mixed with 300 parts of grade W12EST silanized powdered quartz (from Quarzwerke Frechen, Germany) in a dissolver, evacuated in a pressure vessel, and then heated to a temperature in the range from 80 to 130° C. 95 parts of molten HT 907 hardener (from Ciba SC Ltd) and one part of DY 63 accelerator (from Ciba SC Ltd) were added to this premix in a static mixing system.

b) Operations to the prepared mold: the mold is of stainless steel with a honed surface of surface quality defined by Ra<0.1 mm and, respectively, Rz<1 mm. It is preheated to at least 80° C. and not more than 120° C. In each case, a mold-release agent as claimed in one of claims 1 to 9 is applied with the aid of a spray gun to all of the casting surfaces. After evaporation of the water or solvent, the remaining release agent is uniformly distributed.

c) Epoxy resin casting: the casting resin mixture prepared in section a) is heated to at least 80° C. and not more than 140° C., and, in a vacuum container under vacuum, cast into the mold prepared as in section b). Once the curing reaction has concluded, the mold is removed from the vacuum container and the molding, shaped as a test specimen, is removed. For complete crosslinking, the test specimen is aged in a heated cabinet at 140° C. for 24 hours. Tables 1 and 2 give test results from test specimens obtained in this way.

EXAMPLE 11

Example 10 is repeated, but the epoxy resin mixture used is composed of 100 parts of CY184 resin (Ciba SC Ltd), 90 parts of HT907 hardener (Ciba SC Ltd), 1 part of DY63 accelerator (Ciba SC Ltd), and 300 parts of W12EST filler (Quarzwerke Frechen, Germany).

EXAMPLE 12

Test specimens are produced as in Example 10 or 11 in such a way that the molded material mixture comprises slightly less hardener than needed for complete curing of the resin, and also using any desired mold-release agent. After demolding, the test specimens are cleaned with isopropanol and heated to 90–110° C. in a heated cabinet. The mold-release agent of the invention is then applied with the aid of a spray gun to the surfaces of the test specimens. If required, a wiper may be used to distribute the mold-release agent uniformly. The resultant treated specimens are heated to 140° C. in a heated cabinet. This temperature is maintained for at least 30 minutes. The entire procedure from heating of the test specimens is repeated a second time. Heating the test specimens to 140° C. thermally activates constituents which have not crosslinked. During this post-crosslinking, the resin which has not crosslinked reacts with the mold-release agent of the invention and forms a hydrophobic surface whose properties are not substantially different from those of the test specimens whose surfaces were hydrophobicized during molding.

EXAMPLE 13 (COMPARATIVE EXAMPLE)

The casing surfaces of the mold utilized in Example 10 are carefully cleaned with isopropanol. The casting surfaces are then prepared in a manner based on Example 10, section b), but Aquathan 27/077 mold-release agent from the company Block Chemie KG, Germany is used, this being an aqueous emulsion of polydimethylsiloxanes (proportion of constituents with mold-release action: 11.5%). The procedure then used is based on Examples 10 and 11, using the epoxy resin mixtures described in those examples.

EXAMPLE 14 (COMPARATIVE EXAMPLE)

The casting surfaces of the mold, the geometric dimensions of which are identical with those in Example 10, are carefully cleaned with isopropanol. No silicone-containing substances, such as mold-release agents or storing oils, may be used on the mold at any time during its entire period of utilization. The casting surfaces are then prepared in a manner based on Example 10, section b), but Aquathan 96/329 mold-release agent from Block Chemie KG, Germany is used, this being an aqueous emulsion of synthetic oils (proportion of constituents with mold-release action: 15%). The procedure then used is based on Examples 10 and 11, using the epoxy resin mixtures described in those examples. After casting, the residues of adhering mold-release agent are removed, using isopropanol. A technically clean epoxy resin surface is therefore achieved.

Test for Hydrophobic Stability

Hydrophobic stability was tested using the modified rotating-wheel dip test method (MRWDT). To assess recuperation of hydrophobic properties once they have been lost, a cyclic test was carried out in a saline mist chamber. These test methods are described in detail in the following references (references 1 and 2):

[Reference 1] Kaltenborn et al.: "On the Electrical Performance of Different Insulating Materials in a Rotating-Wheel-Dip-Test"; 1997 CEIPD, pp. 398–401, Minneapolis, 1997.

[Reference 2] H. Zhang, R. Hackam: "Surface Resistance and Hydrophobicity of HTV Silicone Rubber in the Presence of Salt-fog"; 1998 CEIDP, Atlanta 1998.

The conditions for the MRWDT test are as follows:

Test conditions 1:

electrolyte conductivity: 0.5 k [mS/cm]

electrical field: 0.6 [kV/cm]

Test conditions 2:

electrolyte conductivity: 1.5 k [mS/cm]

electrical field: 0.6 [kV/cm]

Test results

The average failure times of the various materials exhibited in the examples are given in Table 1.

Table 1 shows the results for test conditions 1.

Table 2 shows the results for test conditions 2.

TABLE 1

| (Test conditions 1) | | | | |
|---|---|---|---|---|
| Example 1 | Example 4 | Example 6 | Example 12 (Comparison) | Example 13 (Comparison) |
| Failure times (h) 576* | 292 | 427 | 196 | <1 |

*Test terminated, no failure

It can be seen from Table 1 that the moldings produced according to the invention give markedly better results when compared with those produced conventionally.

EXAMPLE 15

If the moldings produced according to the invention are additionally compared with silicones optimized for hydrophobic properties under more demanding conditions (test conditions 2), here again the moldings produced according to the invention can be demonstrated to have markedly better hydrophobic stability. Results of Example 1 compared with Examples 13 and 14, and also with silicones from reference 1, are given in Table 2.

TABLE 2

(Test conditions 2)

|  | Example 1 | Example a) from Ref. 1 | Example b) from Ref. 1 | Example 12 (Comparison) | Example 13 (Comparison) |
| --- | --- | --- | --- | --- | --- |
| Failure times (h) | 282 | 269 | 176 | 168 | <1 |

It can be seen from Table 2 that the moldings produced according to the invention give markedly better results when compared with those produced conventionally. Examples 2 to 9 also give results comparable with Example 1.

Recuperation of Hydrophobic Properties

A substantial advantage of the mold-release agents of the invention as a coating material for electrical insulation is the capability of the insulating layer to regenerate spontaneously once hydrophobic properties have been lost. To assess this effect, various reference materials were compared with the materials of the invention after cyclic aging in a saline mist chamber. The cycle included a 24-hour aging phase and a 24-hour recovery phase. The parameters set during the aging process were as follows:

| | |
| --- | --- |
| Electrical field E: | 0.6 kV/cm (a.c., 60 Hz) |
| Electrolyte conductivity k: | 0.5 mS/cm |
| Spray pressure P: | 0.54 ± 0.02 MPa |
| Throughflow rate: | 1.6 ± 0.2 l/min |
| Test temperature T: | 23 ± 2° C. |

Graphite disks of diameter 35 mm were adhesive-bonded to the ends of the test specimens of length 100 mm and diameter 30 mm, to give electrodes. The angle of contact is a variable which measures hydrophobic properties, and was measured at the start of each period. The results are seen in FIG. 1.

FIG. 1 (Comparison of recuperation of hydrophobic properties for various materials in a saline mist chamber)

It will be seen that in comparison with a standard epoxy resin (REF1) the materials of the invention have markedly stronger recuperation of hydrophobic properties. When comparison is made with a silicone material, however, it will be seen that neither the smaller fall-off in the hydrophobic properties of that material after the aging phase nor the recovery to around the initial values is achieved. This stems from the small thickness of the silicone layer active at the surface of the materials of the invention.

What is claimed is:

1. A mold-release composition for the production of thermoset moldings with a hydrophobicized surface, comprising:
   (i) at least one polydimethylsiloxane with mold-release action of the general formula (I):

$$(CH_3)_3Si—O—[Si(CH_3)_2—O]_m—Si(CH_3)_3 \quad (I),$$

where m is 0 or an integer from 1 to 1000; and
   (ii) at least one reactive, optionally hydrolyzable, silane compound, which is capable of reacting chemically in situ with the thermoset surface which forms during the molding process, the reactive silane compound corresponding to the general formula (III):

$$(CH_3O)_{3-p}(CH_3)_pSi—[O—Si(CH_3)_2]_s—R \quad (III),$$

where:
   p is 0, 1, 2 or 3,
   s is 0 or an integer from 1 to 100,
   R is a monovalent, unsubstituted or hydroxyl-substituted, organic radical, which includes at least one reactive group capable of reacting chemically with an epoxy resin, and the proportion of the reactive silane of component (ii) is in the range from 5 per thousand by weight to 5% by weight based on the total weight of components (i) and (ii).

2. The mold-release composition as claimed in claim 1, wherein the proportion of the reactive silane compound of component (ii) is from 0.1% by weight to 2% by weight, based on the total weight of components (i) and (ii).

3. The mold-release composition as claimed in claim 1, which comprises (iii) further additives.

4. The mold-release composition as claimed in claim 3, wherein component (iii) comprises an aqueous solvent and/or a non-aqueous solvent.

5. The mold-release composition as claimed in claim 1, which comprises, as the at least one reactive silane compound of component (ii), a compound of the general formula (VI):

$$(CH_3O)_{3-p}(CH_3)_pSi—[O—Si(CH_3)_2]_s—[O—Si(CH_3)(R_1)]_r—O—Si(CH_3)_p(OCH_3)_{3-p} \quad (VI)$$

where in the compound of the formula (VI):
   r is an integer from 1 to 5,
   $R_1$, independently of one another, are as defined for R as claimed in claim 1, and
   s is 0 or 1 to 10,
   where the radicals —O—Si(CH_3)_2— and —O—Si(CH_3)(R_1) in the molecule have been arranged in any desired sequence; and
   where in the compound of the formula (III), p is 0 or 1 and s is 0 or 1 to 10.

6. The mold-release composition as claimed in 5, wherein r is 1, 2 or 3.

7. The mold-release composition as claimed in claim 1, which is an oil-in-water emulsion.

8. A method of producing a thermoset molding with a hydrophobicized surface, which comprises applying the mold-release composition as claimed in claim 1 to a mold wall.

9. The method as claimed in claim 8, which comprises producing the thermoset molding from polycondensates or polyadducts, which optionally comprise additives.

10. The method as claimed in claim 9, wherein the thermoset molding is produced from a thermoset molding composition selected from the group consisting of curable phenol-formaldehyde plastics, curable bisphenol resins, curable urea-formaldehyde plastics, polyimides, polybenzimidazoles, epoxy resins, unsaturated polyester resins, poly-diallylphthalate resins, curable melamine-phenol-formaldehyde molding compositions, and crosslinked polyurethanes.

11. The method as claimed in claim 10, wherein the thermoset molding compositions are (a) aromatic epoxy resin and/or cycloaliphatic epoxy resins, or (b) PU casting compositions.

12. The method as claimed in claim 8, which comprises producing the thermoset molding using filled epoxy resins or PU resins.

13. A thermoset molding with a hydrophobicized surface produced by the method according to claim 8.

14. The mold-release composition as claimed in claim 1, which further comprises, as a compound with mold-release action, at least one silane of the general formula (II),

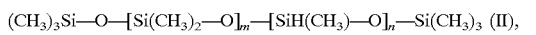    (II), where in the compound of the formula (II):
  m is 0 or an integer from 1 to 1000,
  n is an integer from 1 to 50, and
  the dimethylsilyloxy groups and the methylhydrosilyloxy groups in the molecule are arranged in any desired sequence, and where the at least one silane compound of the formula (II) is present in a concentration of from 0.1% by weight to 50.0% by weight, based on the weight of the compounds in the formula (I).

15. The mold-release composition as claimed in claim 14, wherein the at least one silane compound of the formula (II) is present in a concentration of from 1.5% by weight to 5.0% by weight, based on the weight of the compounds in the formula (I), and n is an integer from 1 to 10 in the formula (II).

16. The mold-release composition as claimed in claim 1, wherein m is an integer from 10 to 50 in the compound of the formula (I).

17. The mold-release composition as claimed in claim 1, wherein p is 0 or 1, and s is 0 or 1 to 10 in the compound of the formula (III).

18. The mold-release composition as claimed in claim 17, wherein the reactive substituent R is at least one of hydroxyl, amino, the isocyanate group, an ester group, and glycidyl in the compound of the formula (III).

19. The mold-release composition as claimed in claim 18, wherein the ester group is an acetyl ester group, and the glycidyl is a 3-glycidoxypropyl residue.

20. A mold-release composition for the production of thermoset moldings with a hydrophobicized surface, comprising:
  (i) at least one polydimethylsiloxane with mold-release action of the general formula (I):

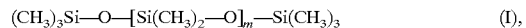    (I), where m is 0 or an integer from 1 to 1000; and
  (ii) at least one reactive, optionally hydrolyzable, silane compound which is capable of reacting chemically in situ with the thermoset surface which forms during the molding process, wherein the proportion of the reactive silane compound of component (ii) is in the range from 5 per thousand by weight to 5% by weight, based on the total weight of components (i) and (ii).

21. The mold-release composition as claimed in claim 20, wherein m is an integer from 10 to 50.

22. A mold-release composition for the production of thermoset moldings with a hydrophobicized surface, comprising:
  (i) at least one polydimethylsiloxane with mold-release action; and
  (ii) at least one reactive, optionally hydrolyzable, silane compound which is capable of reacting chemically in situ with the thermoset surface which forms during the molding process, the proportion of the reactive silane compound of component (ii) is in the range from 5 per thousand by weight to 5% by weight, based on the total weight of components (i) and (ii);
  wherein the reactive silane compound is at least one of acetoxy-methyltrimethoxysilane, acetoxypronpyltrimethoxy-silane, hydroxymethyltriethoxysilane, hydroxy-methyltrimethylsilane, and isocyanatopropyl-triethoxysilane.

* * * * *